Patented Jan. 15, 1929.

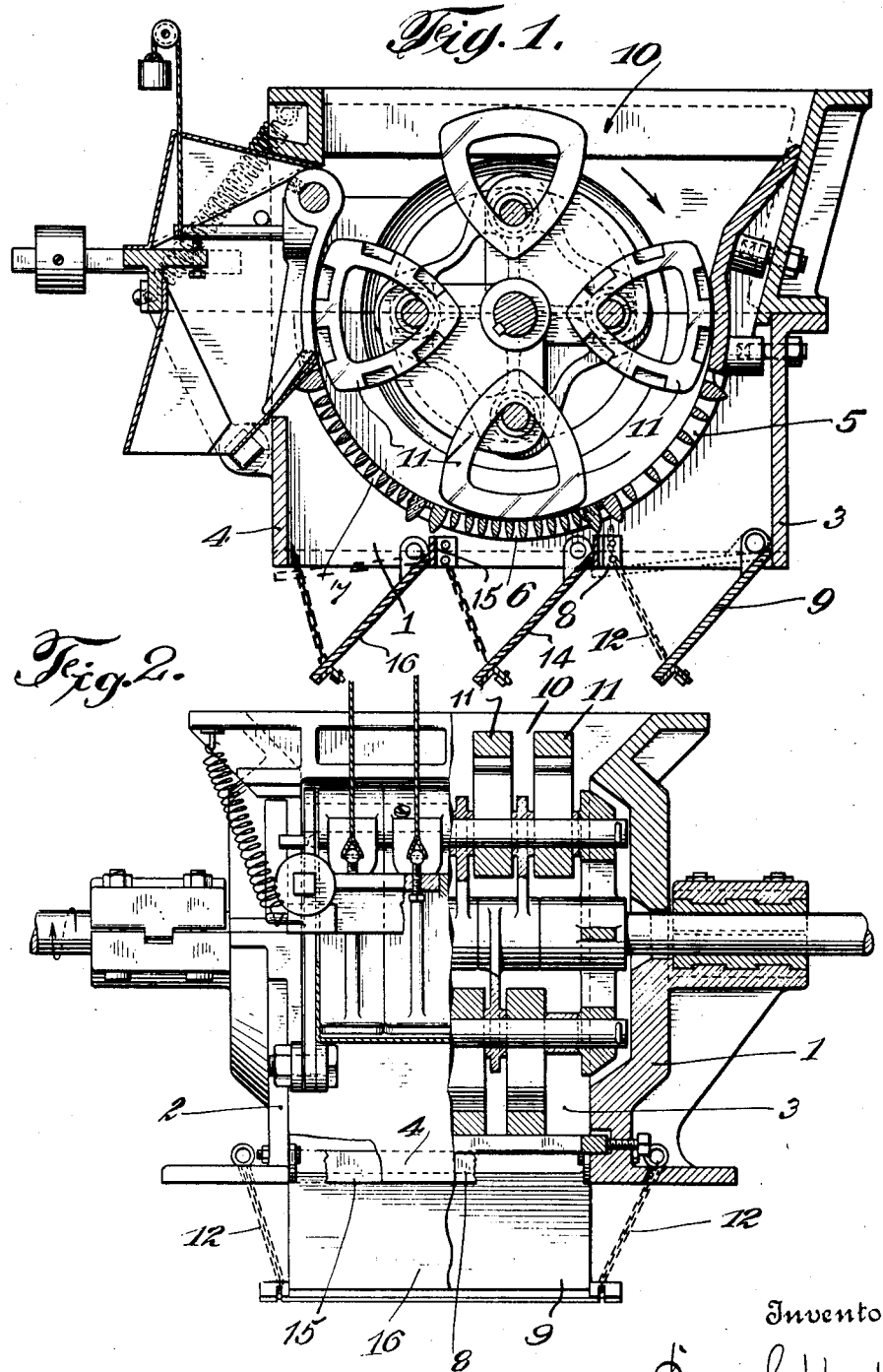

1,698,758

UNITED STATES PATENT OFFICE.

PAUL S. KNITTEL, OF JERSEY CITY, NEW JERSEY.

PULVERIZER.

Application filed October 21, 1927. Serial No. 227,729.

This invention relates to rotary crushers and pulverizers, especially to their grate bar system and discharge openings in their lower half.

The principal object of the present invention is to make provision for varying the size of product from the same machine and equipment.

Another object of the invention is to secure various sizes of products by providing a plurality of series of grate bars for delivering the desired sizes of product with partitions separating the respective outlets and with suitable gates controlling the outlets.

The invention accordingly consists in the combination of elements and arrangements of parts wherein a more effective crusher is secured.

In the accompanying drawing, wherein like symbols refer to like parts wherever they occur, Fig. 1 is a vertical cross-section taken through the center of a rotary pulverizer;

Fig. 2 is a vertical length section taken through right hand half of the mcahine and a rear view of it.

My invention is shown in connection with a pulverizer of which the side walls 1 and 2, front wall 3 and rear wall 4 form the discharge opening. The grate bars 5, 6 and 7 are sections supported by the side walls 1 and 2. At the lowest edge of grate bar section 5 fastened to the side walls 1 and 2 is placed a cross wall 8. Together with the gate 9 which is hinged to the side walls 1 and 2 cross wall 8 forms an extra hopper under grate bar section 5. Closing gate 9 this hopper will fill up and close the openings in grate bar section 5.

The gate 14 similar to gate 9 may be pivoted adjacent the partition 8 to control the outlet from the grate bar 6 by closing against the partition wall 15 similar to the wall 8. A third gate 16 pivoted adjacent the partition 15 will control the outlet from the grate bar 7. The gates 9, 14 and 16 are shown of the same construction to illustrate one way of controlling independently the outlets from the respective grate bars. It will be understood that other suitable mechanism may be utilized for this purpose.

The material is fed to the machine at 10, broken up by rings, hammers, sectors 11, etc., as the machine may be equipped. Crushed and driven through the openings in the grate bar sections 5, 6 and 7 the material will pass into the discharge opening formed by walls 1, 2, 3 and 4. As the various gates can be closed by chains or levers 12 and kept closed by bolts and washers by closing the gate 9 the machine fills up the hopper under grate bar section 5 and the following material has to pass over section 5 to be discharged through sections 6 and 7 depending upon whether one or both of the gates 14 and 16 are open. Therefore, it must be small enough to pass the openings in 6 and 7.

As section 5 has larger openings for a product of larger size a plurality of different products can be produced when the openings in 5 correspond with the hardness of the material and velocity of machine to allow the discharge through sector 5 when gate 9 is open. This is required in crushing coal for power houses equipped with stoker firing and powdered coal machinery. The stokers will require a one to one and a half inch size for best efficiency where the powdered coal machinery requires a one quarter inch material.

Leaving gate 9 open and giving sector 5 sufficient and large enough openings, the coal will be crushed to size and driven through sector 5 giving a large size product suitable for stokers. After the daily supply is furnished gate 9 is closed. The hopper underneath fills up and therefore the following coal has to pass over and through the sectors 6 and 7. As their openings correspond with the size of product required by the powdered coal machinery—for instance—a one quarter inch product, the machine is able to furnish one or more sizes without changing grate bars or losing time in the running.

Obviously, the invention admits of considerable modification without departing from the invention; therefore, I do not wish to be restricted to the particular forms and arrangements shown in the drawing:

What I claim is:

1. A rotary pulverizer or crusher having a grate bar system as grinding surface said grate bars being spaced with a gate underneath and a cross wall at the end of the larger openings whereby when said gate is closed a product corresponding with the smaller size openings is produced and when the gate is open a larger product is obtained through the larger openings.

2. A rotary pulverizer or crusher having a grate bar system as grinding surface said grate bars being spaced with larger openings in front and smaller openings in the back with a gate underneath and a cross wall at the end of the larger openings whereby when said gate is closed a product corresponding with the smaller size openings is produced and when the gate is open a larger product is obtained through the larger openings in front.

3. A rotary pulverizer or crusher having a grate bar system as grinding surface said grate bars being spaced with larger openings in front and smaller openings in the back with louvres underneath and a cross wall at the end of the larger openings whereby when said louvres are closed, a product corresponding with the smaller size openings is produced and when the louvres are open, a larger product is obtained through the larger openings in front.

4. A rotary crusher and pulverizer having grate bar sections of different openings as grinding surface which can be closed by gates forming individual hoppers with crosswalls at the end of each section allowing the production of corresponding products from each section to be delivered from separate outlets or a single product from one section according to the closing or opening of the gates.

5. A rotary crusher having grate bar sections with different sized openings as grinding surfaces, means for forming independent outlets from each of the sections and devices for controlling the said outlets to allow the production of corresponding products from each section to be delivered independently by the operation of said devices.

6. A rotary crusher having a plurality of grate bar sections adapted to deliver products of different sizes, means providing outlets for the respective sections and devices for closing said outlets whereby when a respective outlet is closed, the corresponding grate bars become ineffective.

7. A rotary closure comprising a plurality of grate bar sections adapted to deliver products of different sizes, means forming outlets from the respective sections, devices for controlling certain of said outlets whereby products of different sizes may be delivered independently from the same crusher.

PAUL S. KNITTEL.